US012557834B2

(12) United States Patent 
Zografos

(10) Patent No.: US 12,557,834 B2 
(45) Date of Patent: Feb. 24, 2026

(54) EDIBLE FILMS AND COATINGS EMPLOYING WATER SOLUBLE CORN PROLAMIN AND OTHER FUNCTIONAL INGREDIENTS

(71) Applicant: Akorn Technology, Inc., Oakland, CA (US)

(72) Inventor: Antonios Zografos, Oakland, CA (US)

( * ) Notice: Subject to any disclaimer, the term of this patent is extended or adjusted under 35 U.S.C. 154(b) by 577 days.

(21) Appl. No.: 17/918,506

(22) PCT Filed: Apr. 16, 2021

(86) PCT No.: PCT/US2021/027725 
§ 371 (c)(1), 
(2) Date: Oct. 12, 2022

(87) PCT Pub. No.: WO2021/211995 
PCT Pub. Date: Oct. 21, 2021

(65) Prior Publication Data 
US 2023/0143910 A1 May 11, 2023

Related U.S. Application Data

(60) Provisional application No. 63/011,240, filed on Apr. 16, 2020.

(51) Int. Cl. 
*A23P 20/10* (2016.01) 
*A23B 7/154* (2006.01) 
*A23B 7/16* (2006.01)

(52) U.S. Cl. 
CPC ............ *A23P 20/105* (2016.08); *A23B 7/154* (2013.01); *A23B 7/16* (2013.01); *A23P 20/11* (2016.08)

(58) Field of Classification Search 
None 
See application file for complete search history.

(56) References Cited

U.S. PATENT DOCUMENTS

| 4,683,256 A | 7/1987 | Porter et al. |
| 5,182,130 A | 1/1993 | Haralampu et al. |
| (Continued) | | |

FOREIGN PATENT DOCUMENTS

| EP | 0383428 | 8/1990 |
| WO | 2003024253 A1 | 3/2003 |
| (Continued) | | |

OTHER PUBLICATIONS

International Search Report and Written for PCT/US2021/027725 dated Jul. 14, 2021, 9 pages.

*Primary Examiner* — Lien T Tran

(57) ABSTRACT

A method of producing an aqueous solution of zein suitable for forming edible coatings includes combining zein with an alcohol-free, non-corrosive amphipathic carrier solvent (e.g., [1,3]-propanediol), and adding a surfactant (e.g., surfactin) thereto, forming a Phase I solution. The surfactant may be non-ionic or anionic as determined by the type of zein being used. The Phase I solution is combined with a Phase II aqueous solution including primarily water without alcohol to provide an aqueous coating solution of zein. A plasticizer (e.g., polyethylene glycol) or fatty acid (e.g., lauric acid) may be added to the Phase II solution to enhance the zein coating. The resulting coating solution may then be applied on food, and dried, to form an edible coating.

15 Claims, 4 Drawing Sheets

(56)                References Cited

U.S. PATENT DOCUMENTS

|                   |      |         |                   |
| ----------------- | ---- | ------- | ----------------- |
| 5,324,351    | A  | 6/1994  | Oshlack et al.    |
| 5,580,959    | A  | 12/1996 | Cook et al.       |
| 6,869,628    | B2 | 3/2005  | Krotcha et al.    |
| 9,273,227    | B2 | 3/2016  | Freeman et al.    |
| 2005/0191390 | A1 | 9/2005  | Krochta et al.    |
| 2009/0162516 | A1 | 6/2009  | Brown et al.      |
| 2010/0301254 | A1 | 12/2010 | Jabar, Jr. et al. |
| 2017/0290777 | A1 | 10/2017 | Yang et al.       |

FOREIGN PATENT DOCUMENTS

| WO | 2005084300          | 9/2005 |                 |
| -- | ------------------- | ------ | --------------- |
| WO | WO-2006002346  A2 * | 1/2006 | .............. A23P 20/20 |
| WO | 2014138318          | 9/2014 |                 |

* cited by examiner

Untreated                    Treated

Untreated            Treated

Untreated                    Treated

EDIBLE FILMS AND COATINGS EMPLOYING WATER SOLUBLE CORN PROLAMIN AND OTHER FUNCTIONAL INGREDIENTS

PRIORITY CLAIM

The present application claims the benefit of the earlier filing date of U.S. provisional patent application No. 63/011,240 filed on Apr. 16, 2020, and entitled "Edible Films And Coatings Employing Water Soluble Corn Prolamin And Other Functional Ingredients".

FIELD OF THE INVENTION

The present disclosure relates to a method of producing an aqueous solution of zein suitable for forming edible coatings. The present disclosure also relates to an aqueous solution of zein produced in accordance with such method, and a method of forming an edible coating on an edible article employing such aqueous solution of zein.

RELATED ART

Food loss is a term of art that refers to food that spoils, and is therefore discarded, ranging from initial harvest up to the retail level. Food waste refers to food that is discarded by retailers, food service providers and consumers.

One-third of all food produced worldwide (approximately 1.3 billion tons per year) is lost or wasted. The value of the lost and wasted food is estimated to be US$1 Trillion annually.

Restaurants, institutional and foodservice establishments and households are responsible for approximately 70% of all lost and wasted food. Two thirds of that is food that exceeded its shelf life.

Vegetables and fruits are composed of living tissues that continue to undergo physiological and biochemical changes after harvesting, adversely affecting their quality and shelf life. Respiration and transpiration are the main factors affecting the shelf life of vegetables and fruits. Oxygen is necessary for respiration to take place. Once respiration takes place, the carbohydrate content and weight of the vegetables and fruits will decrease, affecting their quality and taste. Water loss by transpiration is the main cause of products' deterioration, making vegetables and fruits lose nutritional value and undergo appearance changes, such as turgidity, wilting, and impaired color and texture.

Ethylene is a plant hormone that regulates fruit ripening by coordinating the expression of genes that are responsible for a variety of processes, including a rise in respiration, autocatalytic ethylene production, and changes in color, texture, aroma and flavor. Most fruits produce ethylene that starts the ripening process. The level of ethylene in under-ripe fruit is very low, but as fruit develop, they produce larger amounts of ethylene that speeds up the ripening process or the stage of ripening known as the "climacteric."

Shelf life can be regulated by controlling the respiration and transpiration rates of fresh vegetables; in general, the lower the rate, the longer the shelf life, although the produce needs to maintain a minimum level of oxygen (around 3%) to avoid development of anaerobic reactions, which create off-flavors. Others have attempted to extend shelf life of fruit by inhibiting ethylene uptake, but that method is not the focus of the present invention.

Controlling moisture and oxygen levels is essential to preserve not only fresh produce but also the quality and shelf stability of tree nuts. Shelled and in-shell nuts are naturally low in moisture (approximately 3-6% water) and high in fat (50% or higher). Unlike fruits and vegetables, tree nut quality suffers when additional moisture is absorbed from the environment. As a result, tree nuts may lose some of their crunch, mold may start to grow, and lipid oxidation increases. Lipid oxidation is a complex series of undesirable reactions that cause the breakdown of fats and oils; it occurs when oxygen reacts spontaneously with the fatty acids in fats to form primary breakdown products (e.g., peroxides, conjugated dienes). As oxidation progresses, secondary products (e.g., volatile aldehydes, ketones) are generated that give rise to off-flavors and off-odors. This condition is referred to as oxidative rancidity. Hydrolytic rancidity, on the other hand, occurs when free fatty acids are released from fats by the action of naturally occurring food enzymes in the presence of moisture.

To extend the shelf life of vegetables, fruits and nuts, the rate of both oxygen exchange and moisture exchange must be controlled. These factors are generally controlled with various types of packaging. For example, Modified Atmosphere Packaging (MAP) replaces the air in a sealed food package with strictly controlled gaseous mixtures containing carbon dioxide, nitrogen, or other gases. Another example is Active Packaging (AP) that incorporates components that release or absorb substances into or from the packaged food or the environment surrounding the food (such as oxygen and moisture scavengers and ethylene absorbers, antioxidant releasers, etc.).

Both MAP and AP packaging techniques involve synthetic materials; as the world moves away from the use of synthetic materials, interest in edible packaging materials is increasing. Of particular appeal are those materials which are plant-based, renewable, have a small carbon footprint, and can be applied directly on the product in the form of an edible coating.

The use of edible coatings for fresh fruits and vegetables is not a new concept. Fruits and vegetables are coated in nature by a natural waxy coating called a cuticle, which consists of a layer of fatty acid-related substances, such as waxes and resins, with low permeability to water. The purpose of edible coatings is to mimic or enhance that natural barrier, if already present, or to replace it in the cases where washing and handling have partially removed or altered it.

Coatings preserve the organoleptic properties of foods, retard moisture loss, create a barrier for gas exchange between the fresh fruit and the surrounding atmosphere. Such coatings may also improve the mechanical handing properties of foods by helping to maintain their structural integrity, thereby retaining volatile flavor compounds. Moreover, one of the most important advantages of an edible coating is that it can be eaten together with the fruit (or other food), thus reducing packaging wastes.

The main components used thus far in the formulation of edible coatings for fruits and vegetables are polysaccharides, lipids and proteins.

The most recent trends in the field of polysaccharide coating applications include the shelf-life extension of fresh-cut highly-perishable food; the application of coatings as a pre-frying treatment to reduce the oil consumption in deep-fat fried products; and the use as pre-dried treatments to improve the retention of nutrients and quality characteristics of dehydrated and lyophilized food. Unfortunately, polysaccharide coatings are highly hydrophilic. Thus, while they may be effective gas barriers, they are poor moisture barriers.

Edible lipids used to develop edible coatings include beeswax, candelilla wax, carnauba wax, etc. Lipids are frequently combined with resins (such as shellac, a secretion by the insect *Laccifer lacca*) to impart gloss. Lipid-based edible coatings have a low affinity for water, which explains why they have low water vapor permeability. They are most commonly applied to fresh fruit for functional and cosmetic purposes. "Whitening" is caused when commodities go through "sweats" due to temperature and humidity changes. As a result, the fruit surface shows white stains that are perceived by the consumers as pesticide residue, thus affecting purchasing behavior. Waxes are applied as microemulsions, and morpholine is considered the best emulsifier. However, use of morpholine is undesirable due to health concerns; its use is not allowed in the European Union. Ammonia is used instead as a substitute base. Ammonia is corrosive and irritant, so its use is not without problems. Carnauba/shellac coatings are generally allowed for citrus fruit, melons, apples, pears, peaches, pineapples, pomegranates, mangoes, avocados and papayas; such coatings are generally used only as a glazing agent on nuts. Carnauba/shellac coatings are not effective on fruits and vegetables with high moisture content. In addition, shellac is considered an animal product and is therefore not compatible with plant-based diets.

A variety of proteins from natural sources have been used to form edible coatings, such as: casein, whey protein, collagen, gelatin, keratin, wheat gluten, soy protein, peanut protein, corn-zein and cotton seed protein. These coatings usually exhibit good mechanical properties and also present good oxygen barrier properties at low relative humidity, although most of them are poor barriers against water vapor due to their hydrophilic nature.

A protein that is best suited to form an edible coating should meet most of the following requirements:

the protein coating should be resistant to environmental factors so that it remains intact and covers a product adequately when applied;

the protein coating should not deplete oxygen or allow a buildup of excessive carbon dioxide (a minimum of 1%-3% oxygen is required inside a fresh fruit or vegetable to avoid a shift from aerobic to anaerobic respiration which creates off-flavors);

the protein coating should reduce water vapor exchange;

the protein coating should improve appearance, maintain structural integrity, and improve mechanical handling properties;

the protein coating should be capable of carrying active agents (antioxidants, vitamins, etc.) and retain volatile flavor compounds;

the protein coating should melt above 40° C. without decomposition;

the protein coating should be easily applied, non-sticky, not tacky, and have efficient drying performance;

the protein coating should not interfere with the quality of the fresh fruit or vegetable and not impart undesirable flavor;

the protein coating should have low viscosity and be economical;

the protein coating should be translucent to opaque but not like glass; and the protein coating should be able to tolerate slight pressure without breaking.

The protein zein meets most, if not all, of the desirable factors for an edible coating listed above. The protein zein, derived from corn, is well understood and is used in a range of industries, including food, pharmaceuticals, plastics, etc.

Zein is a corn prolamin that can be used to form edible coatings for application to whole or cut fruits and vegetables, tree nuts, seeds and other foodstuff to extend their shelf life by reducing moisture loss and regulating respiration. Edible zein coatings may also be applied to pharmaceuticals and nutraceuticals as carriers of flavorings and other functional ingredients, and also to control or delay the release of active ingredients. Edible films may be used to create biodegradable and biocompatible packaging for a variety of applications.

Within the food industry, zein coatings are used today for fruits, vegetables, nuts, candies, confectionary and other foods. Recent studies show zein coatings to extend the shelf life of apples, mangoes and shell eggs. Zein coatings have also been shown to reduce oil uptake of deep-fat frying of cowpea paste and starchy products like mashed potato balls. Antimicrobial zein edible coatings containing the antibacterial polypeptide nisin, calcium propionate or sorbic acid have been studied to control *Listeria monocytogenes* on ready-to-eat chicken and cooked sweet corn. Apart from the food industry, the low oxygen permeability and grease-resistant properties of zein films have also led to the development of recyclable coated paper.

Zein is an FDA approved (Generally Recognized As Safe), biodegradable, biocompatible and renewable material. Zein meets vegan, gluten-free, Kosher and Halal diet requirements, and may also be produced as GMO-free and organic.

Zein forms strong films that are good moisture and oxygen barriers, extending the shelf life of food products. It also encapsulates and slowly releases micronutrients, flavors, and other functional ingredients; it is used as a coating for pharmaceuticals, nutraceuticals, candy, and it may be used to enhance the sensory or nutrient profile of food products.

Notwithstanding all of the benefits provided by zein for use as an edible coating, the use of zein to form such edible coatings has not been widely adopted. This is almost certainly because zein is considered insoluble in water. Zein is soluble in aqueous alcohol solutions with an alcohol content greater than 65% or in aqueous alkaline solutions of pH 11.5 or above. The aqueous alcohol-based zein solutions are the basis for most zein coatings formed at present. Zein also exhibits good solubility in systems that utilize ammonia or another highly-alkaline, corrosive aqueous carrier. The corrosive nature of ammonia poses problems with manufacturing, coating application, and safety. Alkaline aqueous carriers and/or ammonia are not food safe, and therefore, the use of ammonia or another corrosive aqueous carrier prohibits the use of zein in many food and pharma applications.

Because zein is considered soluble only in aqueous alcohol solutions or highly alkaline aqueous solutions (e.g., ammonia-based solutions that tend to be corrosive), its adoption has been limited due to the cost and risk associated with the use of flammable or corrosive materials and explosive vapors in production environments. Apart from actual dangers posed when forming zein coatings from flammable or corrosive solutions, consumers may also be skittish about consuming products that are coated using an ammonia-based coating solution, even when such ammonia is removed during the curing process well before reaching the consumer.

Thus, there is a recognized, but unfulfilled, need for a method to produce aqueous zein solutions suitable for applying an edible zein coating over an item to be consumed wherein the aqueous zein solution is neither flammable (due to the presence of alcohol) nor corrosive (due to the presence of ammonia or another highly alkaline component).

SUMMARY

In one aspect, the present invention relates to a method of producing an alcohol-free, non-corrosive, aqueous solution of zein suitable for forming edible coatings. Such method includes providing an alcohol-free, non-corrosive amphipathic carrier solvent. Zein is combined with the alcohol-free, non-corrosive amphipathic carrier solvent. A surfactant is combined with the zein and alcohol-free, non-corrosive amphipathic carrier solvent to form a Phase I solution. A Phase II aqueous solution is also provided consisting primarily of water and not including alcohol. The Phase I solution is combined with the Phase II aqueous solution to provide an aqueous solution of zein.

In some embodiments of such method, the step of combining zein with the alcohol-free, non-corrosive amphipathic carrier solvent includes heating the combined zein and alcohol-free, non-corrosive amphipathic carrier solvent to dissolve the zein in the alcohol-free, non-corrosive amphipathic carrier solvent.

In some embodiments of such method, the step of combining zein with the alcohol-free, non-corrosive amphipathic carrier solvent includes heating the combined zein and alcohol-free, non-corrosive amphipathic carrier solvent to at least 105 degrees Centigrade.

In some embodiments of such method, the step of providing the Phase II aqueous solution includes adding an edible plasticizer to such aqueous solution to produce a more flexible zein coating. In some of these embodiments, the edible plasticizer includes polyethylene glycol.

In some embodiments of such method, the step of providing the Phase II aqueous solution includes adding a fatty acid to such aqueous solution.

In some embodiments of such method, the step of providing the Phase II aqueous solution includes adding lauric acid to such aqueous solution.

In some embodiments of such method, the step of providing the Phase II aqueous solution includes adding a further ingredient selected from the group of ingredients consisting of flavorings, nutrients, mold inhibitors, sprout inhibitors, gloss agents, essential oils, extracts, cannabidiol, fungicides and antibacterials.

In some embodiments of such method, the step of providing the Phase II aqueous solution includes adding a further ingredient selected from the group of ingredients consisting of waxes, lipids, polysaccharides, cellulose and cellulose derivatives.

In some embodiments of such method, the step of providing the alcohol-free, non-corrosive amphipathic carrier solvent includes selecting such alcohol-free, non-corrosive amphipathic carrier solvent from the group of amphipathic carrier solvents consisting of propylene glycol, glycerol, and [1,3]-propanediol.

In some embodiments of such method, the step of providing the alcohol-free, non-corrosive amphipathic carrier solvent includes [1,3]-propanediol.

In some embodiments of such method, the step of combining a surfactant to form the Phase I solution includes selecting the surfactant from the group of non-ionic surfactants consisting of polysorbate 80, sorbitan, and surfactin.

In some embodiments of such method, the step of combining a surfactant to form the Phase I solution includes combining surfactin.

In some embodiments of such method, the step of combining a surfactant to form the Phase I solution includes selecting the surfactant from the group of anionic surfactants consisting of rhamnolipids, sophorolipids, phospholipids, mono-glycerides and di-glycerides.

In some embodiments of such method, the step of combining zein with the alcohol-free, non-corrosive amphipathic carrier solvent includes combining one part zein with approximately four parts alcohol-free, non-corrosive amphipathic carrier solvent by weight.

In some embodiments of such method, the step of combining the Phase I solution with the Phase II aqueous solution includes heating the Phase I solution to approximately 65 degrees Centigrade, heating the Phase 2 solution to approximately 70 degrees Centigrade, and slowly delivering the Phase I Solution into the Phase 2 solution under continuous stirring.

In some embodiments of such method, the step of combining the Phase I solution with the Phase II aqueous solution includes the step of mixing approximately one part of Phase I solution with 8 parts of Phase II solution by weight.

In another aspect, the present invention relates to an alcohol-free, non-corrosive, aqueous solution of zein produced by providing an alcohol-free, non-corrosive amphipathic carrier solvent. Zein is combined with the alcohol-free, non-corrosive amphipathic carrier solvent. A surfactant is combined with the zein and alcohol-free, non-corrosive amphipathic carrier solvent to form a Phase I solution. A Phase II aqueous solution is also provided consisting primarily of water and not including alcohol. The Phase I solution is combined with the Phase II aqueous solution to provide the alcohol-free, non-corrosive, aqueous solution of zein.

In another aspect, the present invention relates to method of forming an edible coating on an edible article. An alcohol-free, non-corrosive, aqueous solution of zein is produced by providing an alcohol-free, non-corrosive amphipathic carrier solvent. Zein is combined with the alcohol-free, non-corrosive amphipathic carrier solvent. A surfactant is combined with the zein and alcohol-free, non-corrosive amphipathic carrier solvent to form a Phase I solution. A Phase II aqueous solution is also provided consisting primarily of water and not including alcohol. The Phase I solution is combined with the Phase II aqueous solution to provide the alcohol-free, non-corrosive, aqueous solution of zein. A thin film of such alcohol-free, non-corrosive, aqueous solution of zein is applied on the edible article. The applied film is then dried to form an edible coating on the edible article.

DETAILED DESCRIPTION

Figure 1:
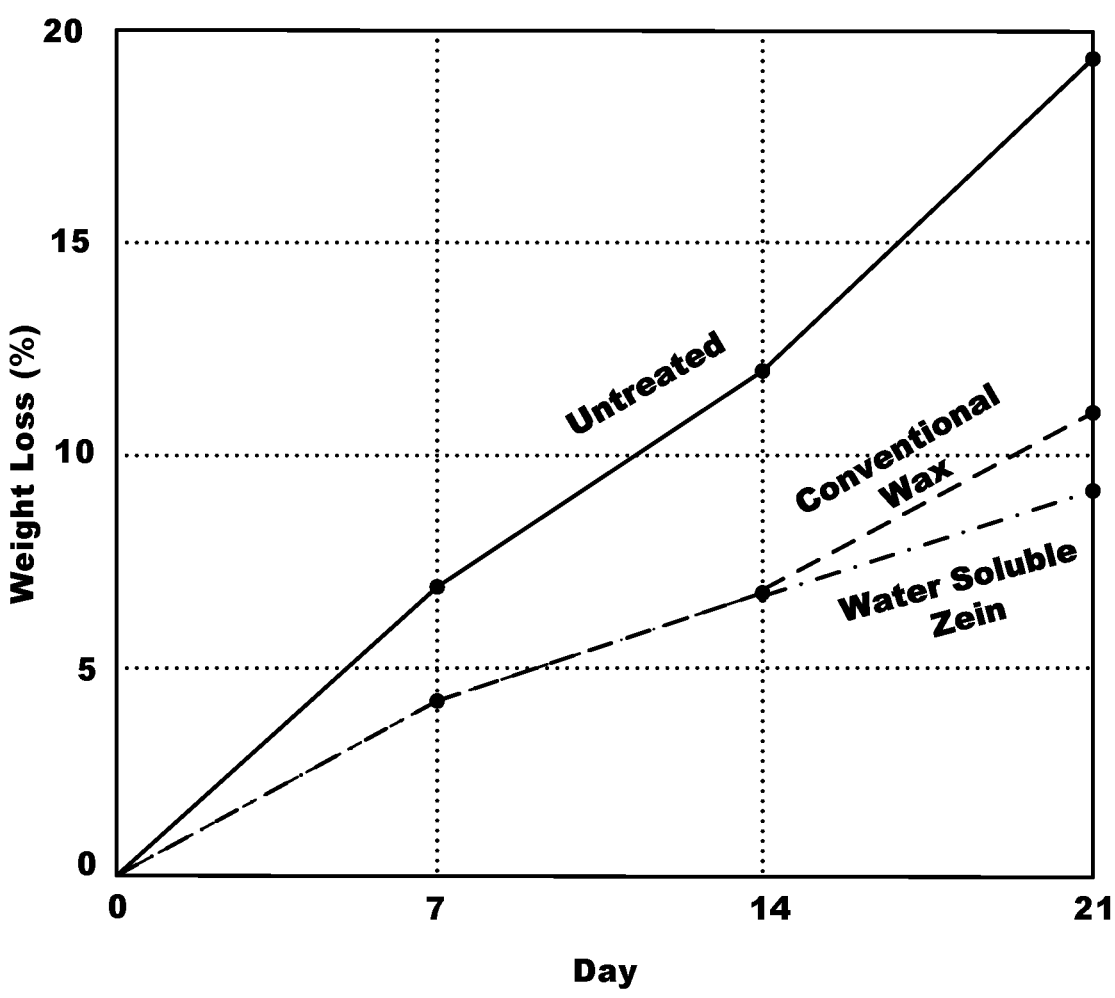
FIG. 1 is a plot of mass loss for oranges that were harvested and washed according to established procedures and were then divided into two batches, one coated with a formulation as described herein, and one left uncoated.

A method of producing an aqueous solution of zein suitable for forming edible coatings will now be described.

An alcohol-free, non-corrosive amphipathic carrier solvent is provided and combined with zein. A surfactant is added to form a Phase I solution. A Phase II aqueous solution is provided consisting primarily of water and not including alcohol. The Phase I solution is combined with the Phase II aqueous solution to provide an aqueous solution of zein. As noted above, prior work in the field of zein-based coatings has used alcohol/water systems consisting of upwards of 60% alcohol in order to solubilize the zein. By omitting alcohol, the resulting aqueous solution is not readily flammable.

Regarding the Phase I solution, Applicant has found that suitable amphipathic carrier solvents include propylene glycol, glycerol, [1,3]-propanediol, ethylene glycol or combinations thereof. None of these solvents is readily flammable like alcohol, nor corrosive like ammonia.

A surfactant can serve to lower the surface tension between a liquid and a solid, or between two liquids, thereby aiding in mixing of two liquids or dissolution of a solid within a liquid. Applicant has found that certain surfactants perform better than others depending upon the type of zein being used. Non-ionic surfactants tend to perform better with some types of zein, while anionic surfactants perform better with other types of zein. More specifically, the selection of the surfactant depends upon the zein $\zeta$-potential which in turn depends on the zein pH which is set during the zein manufacturing process. Generally non-ionic surfactants are used when the $\zeta$-potential is negative and anionic surfactants are used when the $\zeta$-potential is positive although a mixture of non-ionic and anionic surfactants of both high and low Hydrophilic-Lipophilic-Balance (HLB) values may be employed.

Applicant has found suitable non-ionic surfactants to include polysorbate 80, sorbitan, surfactin or combinations thereof. Applicant has found that suitable anionic surfactants include rhamnolipids, sophorolipids, phospholipids, mono- and di-glycerides or combinations thereof.

In forming the Phase I solution, it may be advantageous to heat the combined zein and amphipathic carrier solvent to dissolve the zein in the amphipathic carrier solvent. Applicant has found that heating the combined zein and amphipathic carrier solvent to 105 degrees Centigrade or higher can enhance the dissolution of the zein within the amphipathic carrier solvent. Heating the Phase I solution to a temperature above zein's dissolution-point solubilizes the zein with the surfactant and the carrier solvent. Upon cooling to room temperature, a stable Phase 1 is achieved. In some cases, the carrier solvent itself is first raised to approximately 105 degrees Centigrade; zein is then added with stirring, and the temperature is elevated to the zein dissolution temperature which varies depending upon the particular solvent being used. The solution is maintained at that temperature for approximately 5 minutes, covered, with continuous stirring. The solution is then removed from heat, and the surfactant is immediately added under stirring; stirring continues until the temperature of the solution is below 50 degrees Centigrade. Applicant has, however, discovered that it is not always required to heat the amphipathic carrier solvent as high as 105 degrees Centigrade; for example, propylene glycol has been found to sufficiently dissolve zein at much lower temperatures.

When formulating the Phase I solution, Applicant has found that combining one part zein with approximately four parts amphipathic carrier solvent by weight achieves satisfactory results.

Regarding the Phase II solution, it is often desirable to add an edible plasticizer to the aqueous solution. When zein is applied as a thin coating, it may become somewhat brittle when dried, and the addition of a plasticizer allows the dried zein coating to be more flexible and less likely to crack under physical stress. Applicant has found that polyethylene glycol is one such edible plasticizer that is suitable for this purpose. Other suitable plasticizers include glycerol (GLY), triethylene glycol (TEG), dibutyl tartrate (DBT), levulinic acid (LA), polyethylene glycol 300 (PEG), and oleic acid (OA).

Apart from, or in addition to plasticizers, it may be desirable to add to the Phase II aqueous solution a fatty acid. As noted above, fatty acid-related substances, such as waxes and resins, naturally occur within the outer coatings of some fruits and vegetables and exhibit a low permeability to water. Addition of a fatty acid to the Phase II aqueous solution can reinforce the water vapor barrier provided by zein in the applied coating. Applicant has found that the fatty acid lauric acid, which is non-toxic and naturally found in coconut milk, coconut oil, and palm kernel oil, can enhance the resulting zein coating.

Apart from plasticizers and fatty acids, the Phase II aqueous carrier solution may also include waxes, gums, lipids, polysaccharides, cellulose and cellulose derivatives, and combinations thereof, as well as stabilizers. Polysaccharides may serve as a stabilizer.

In addition, it may be desirable in some instances to add to the Phase II aqueous carrier solution flavorings, nutrients, mold inhibitors, sprout inhibitors, gloss agents, essential oils, extracts, cannabidiol, fungicides and/or antibacterials.

When combining the Phase I solution with the Phase II aqueous solution, Applicant has found that it can be advantageous to heat the Phase I solution to approximately 65 degrees Centigrade, and to heating the Phase II solution to approximately 70 degrees Centigrade. The Phase I solution is then slowly delivered into the Phase II solution under continuous stirring.

Applicant has found that mixing approximately one part of Phase I solution with 8-9 parts of Phase II solution by weight produces a satisfactory and desirable zein-based solution that may be easily applied to form a coating.

The resulting zein-based aqueous solution produced after combining the Phase I solution with the Phase II solution, as described above, is of generally neutral pH, non-alkaline, alcohol-free, presents no flammability risk, and is non-corrosive. The resulting solution is a shelf stable product. This zein-based aqueous solution can be applied as a thin film of on an edible article, and then dried, to form an edible zein-based coating on the edible article. It can be applied to products either as a spray through conventional spray nozzle systems, through immersion in a flume or bath, or by other means. The resulting liquid film dries rapidly under moderately low heat and forms a glossy edible coating.

In one example, the method of producing an aqueous zein solution includes: a) dissolving zein in propylene glycol and reacting it with a surfactant at an elevated temperature to form a Phase I solution; b) preparing a solution of water, polyethylene glycol and a non-toxic fatty acid (e.g., lauric acid) to form a Phase 2 solution; and c) adding the Phase I solution, to the Phase 2 solution at elevated temperature.

If desired, one or more hydrophobic compounds, such as oils or extracts, can be added to the Phase I solution before combining with the Phase II solution; such functional ingredient is added when the temperature of the Phase I solution is below the boiling point of the ingredient.

Similarly, hydrophilic compounds, such as vitamins, may be added to the Phase II solution before it is combined with the Phase I solution. Such hydrophilic functional ingredients may be added to the Phase II solution either at room temperature or under heating, and with continuous stirring.

In certain instances, the Phase II aqueous solution may be provided as an emulsion or colloidal suspension containing waxes, gums and other polysaccharides, cellulose and derivatives such as methylcellulose, hydroxypropyl methylcellulose (HPMC), nanocellulose, etc.

As has been noted above, surfactin, rhamnolipids, and sophorolipids are examples of surfactants which can be used in producing the Phase I solution. They are highly efficient and food safe. Polysorbate 20, polysorbate 60, polysorbate 80, sorbitan, glycerol stereate, and mono- and di-glycerides are other examples of surfactants which are efficient and readily available at relatively low cost.

Regarding proportions of the various ingredients used to form the Phase I, Phase II, and end product zein-based aqueous solution, one satisfactory example uses the following ratios (by weight):

1. Phase I Liquid Concentrate as stand-alone formulation
   a. 79% alcohol-free, non-corrosive amphipathic carrier solvent 79%
   b. 20% zein
   c. 1.0% surfactant
2. Phase II Aqueous Carrier formulation
   a. 97.3% water
   b. 2.4% plasticizer
   c. 0.3% fatty acid
3. Final Coating Solution (After combining Phase I and Phase II)
   a. 11% Phase I
   b. 89% Phase II In some instances, the Phase II solution can be prepared at ambient temperature. In these cases, water is stirred while a plasticizer, such as triethylene glycol or other suitable plasticizer, and a fatty acid such as lauric acid, are slowly added to the water. The resulting pH of the Phase II solution should be maintained between 6.5 and 9.

In some instances, the Phase II solution is prepared by first creating an emulsion of one or more lipids with suitable emulsifiers and stabilizers. A suitable plasticizer and fatty acid are then added to such emulsion.

In other instances, the Phase II solution is prepared by first creating an emulsion or solution of a polysaccharide, such as cellulose, pectin, gelatin, agar-agar or the like. To that emulsion or solution, plasticizers and fatty acids are added.

In some cases, glycerol or another polyol compound can be added to the Phase II solution to promote a higher surface gloss of the resulting zein film.

The pH of the Phase II solution should be adjusted to be between 6.5 and 9 before the Phase II solution is combined with the Phase 1 solution.

With regard to preparation of the final coating solution, the Phase I solution is preferably heated to 65 degrees Centigrade, and the Phase II solution is preferably heated to 70 degrees Centigrade. The Phase I solution is then combined with the Phase II solution using slow delivery of the Phase I solution into the Phase 2 solution under continuous stirring. Slow delivery is achieved via any device capable of inserting continuous small quantities of the Phase I liquid concentrate into the Phase II solution over a period of time. The resulting coating solution pH is approximately 7 (or neutral).

One of Applicant's objectives is to obtain the highest possible zein concentration in the final coating solution with the least amount of carriers, surfactants, plasticizers, etc. On the other hand, Applicant has found that some combinations of zein, amphipathic carrier solvent and surfactant tend to limit the zein concentration in Phase I that can be successfully introduced into the Phase II aqueous solution without causing zein agglomeration; such zein agglomeration results in the formation of a gum instead of a coating following application.

In those instances wherein zein agglomeration is a problem, the amount of zein added to the Phase I solution can be decreased, or the amount of solvent and surfactant, can be increased. However, this will result in the need to increase the amount of final coating solution applied, thus increasing costs and drying time. Alternatively, the amount of coating solution applied can remain constant, but then the net amount of zein deposited on the product will be decreased, thus decreasing the effectiveness of the applied zein coating.

Applicant has found that, through proper selection of the type of zein used, based on its $\zeta$ potential, together with proper selection of the corresponding surfactant, carrier solvent, process temperature, and plasticizer, a resulting zein-based coating solution having a satisfactory percentage of zein can be produced without zein agglomeration.

The resulting coating solution can be applied to foodstuff and other products by different methods such as fluidized bed, panning, dipping, and spraying. In a fluidized-bed the coating solution is sprayed through a set of nozzles onto the surface of fluidized powders to form a shell-type structure. The panning process consists of depositing the product to be coated into a large, rotating bowl. The coating solution is then ladled or sprayed into the rotating bowl, and the product is tumbled within the bowl to evenly distribute the coating solution over the surface of the food material. The dip application method involves submerging the product into a vat containing the coating solution.

Spray application is the most common method of applying a coating to fruits and vegetables. The typical application consists of a metered spray onto the product as it passes over a set of rotating brushes that serve to spread the coating evenly.

Forced air at either ambient or elevated temperature is applied to dry the coating. Drying usually occurs in a heated chamber where rotating brushes help to smooth out the coating, followed by additional brushes for polishing.

The presently described zein solutions eliminate alcohol, thereby removing a solvent that can pose problems during both initial formulation as well as downstream application. The chemistries utilized to form the zein solutions described herein allow for the manufacturing of a stable, food safe zein concentrate (Phase 1) without any hazardous, corrosive, flammable or explosive components. This concentrate shows good shelf stability and can be combined into water (Phase II) at the point of need, thus simplifying the logistics of shipping large volumes of coating material.

Applicant has produced the Phase I solution containing 20% zein with satisfactory results when used as a food-safe solution. Embodiments of the present invention encompass concentrations ranging from less than about 0.5% to about 25%, and greater, zein (by weight) in a food-safe solution. For example, embodiments of the present invention encompass concentrates of about 0.5%, 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16%, 16.5%, 17%, 17.5%, 18%, 18.5%, 19%, 19.5%, 20%, 20.5%, 21%, 21.5%, 22%, 22.5%, 23%, 23.5%, 24%, 24.5%, 25%, and greater, zein in a food-safe carrier solution.

Applicant has found propylene glycol to be well-suited for use as an alcohol-free, non-corrosive amphipathic carrier solvent in the preparation of the Phase I solution. However other non-alcoholic, non-corrosive, amphipathic carriers, such as [1,3]-propanediol, glycerin, and ethylene glycol, may be substituted for propylene glycol.

Surfactin can be used as a non-ionic surfactant for producing the Phase I solution, as the use of a (lipo) polypeptide surfactant represents a highly efficient method of non-aggregation. Surfactin is a cyclic lipopeptide-based biosurfactant produced by a harmless microbe, namely *Bacillus subtilis*. Applicant has found surfactin to be far more efficient than synthetic or natural surfactants. However other food grade non-ionic surfactants such as polysorbate 80, sorbitan, etc. may be substituted for surfactin.

Rhamnolipids can be used as an anionic surfactant for producing the Phase I solution. Rhamnolipids are a class of glycolipid produced by *Pseudomonas aeruginosa*, amongst other organisms, frequently cited as bacterial surfactants. However other food grade anionic surfactants such mono- and di-glycerides, and sodium dodecyl sulfate may be substituted for Rhamnolipids.

Exemplary Process for Formation of Phase 1 Solution

In a particular example, "FloZein" brand zein was obtained from Flo Chemical Corporation of Massachusetts (Product code F4401C). [1,3]-propanediol (e.g., Zemea® brand available from DuPont Tate & Lyle Bio Products), which is a food grade product (a GRAS corn derivative), is used as the amphipathic carrier solvent. In addition, a highly efficient surfactant, e.g. surfactin (available from Kaneka Corporation of Japan), is used. This process produces a water-soluble, alcohol-free zein Phase I solution. The proportions of ingredients by weight are 20% zein and 1% surfactin in a 79% Zemea® [1,3]-propanediol carrier. Any desired hydrophobic additives or functional ingredients at appropriate amounts/

Procedure—Phase I

1) The proportions for a 20% Zein loading are: 79 grams Zemea® [1,3]-propanediol carrier; 20 grams zein; and 1 gram surfactin. All measures are weight/weight, and scale linearly into the final mass.
2) the Zemea® [1,3]-propanediol carrier is placed into a quartz/high silica beaker as a heating vessel. The beaker is covered tightly with aluminum foil and heated on a hotplate, and pre-heated to an elevated temperature of 105 degrees Centigrade.
3) Once the Zemea® [1,3]-propanediol carrier reaches 105 degrees Centigrade, zein is added under continuous stirring and heating.
4) The temperature is allowed to reach 135 degrees Centigrade where it is held for 5 minutes.
5) The heat is turned off and surfactin is immediately added under continuous stirring.
6) Any desired hydrophobic functional ingredients or flavorings such as for example essential oils, extracts, cannabidiol, fungicides and others are added during the cool down cycle at a solution temperature that is below their respective boiling points.
7) The solution is allowed to cool to 50 degrees Centigrade under continuous stirring.
8) The solution may then be allowed to cool to room temperature at which point it is a clear amber viscous liquid and it is shelf stable for several months.

Exemplary Process for Formation of Phase II Solution

The presently described formulation for the Phase II Solution includes water, a plasticizer and a fatty acid.

Procedure—Phase II

1) In this example, the proportions by weight are 97.3% water, 2.4% triethylene glycol and 0.3% lauric acid.
2) Triethylene glycol (plasticizer) and lauric acid (fatty acid) are added to water at room temperature and under continuous stirring.
3) Any desired hydrophilic functional ingredients such as calcium ascorbate, nisin, etc. are also added.
4) The pH of the resulting solution is maintained in the range of 7-9.
5) The solution in heated under stirring to 70 degrees Centigrade.
6) The Phase II solution may remain at 70 degrees Centigrade if combination with Phase I is to begin, or the Phase II solution may be cooled and stored for later use.

Exemplary Process for Formation of the Coating Solution

In this example, 25 grams of Phase I solution are combined with 205.4 grams of Phase II solution.

Procedure—Coating Solution Formation

1) Phase II solution is heated to 70 degrees Centigrade under continuous stirring.
2) Phase I solution is heated to 65 degrees Centigrade under continuous stirring.
3) Phase I solution is slowly added to Phase II solution.
4) Phase 1 disperses within Phase II as a light, cloudy dispersion.
5) The combined solution—the Coating Solution—is maintained under continuous stirring at 70 degrees Centigrade for 3 minutes, and is then removed from heat and allowed to cool to approximately 40 degrees Centigrade under stirring. The pH of this solution is neutral (7).
6) After it is cooled to room temperature, the Coating Solution is ready for use. If properly prepared the Coating Solution exhibits little to no settling of solids and is shelf stable for several weeks.

Exemplary Process for Application of the Coating Solution to Form an Edible Coating For fruit such as citrus or apples, the Coating Solution is sprayed onto the fruit passing under a set of fixed or mobile nozzles. The fruit travels over a slowly rotating bed of brushes. The spraying system has means of controlling the application rate, such as a metering pump controlled by a programmable computer-controlled system, with the aim of providing the optimum amount of coating to the product. Typical desired film thickness is 10-20 micrometers when dried.

Drying occurs in a heated chamber where rotating brushes help to smooth out the coating, followed by additional brushes for polishing. Forced air at approximately 55-60 degrees Centigrade is applied to dry the coating. The drying process lasts approximately 120-150 seconds, depending on the commodity and environmental conditions.

Figure 2:
FIG. 2 shows photographs of treated and untreated bananas after 12 days.
Figure 3:
FIG. 3 shows photographs of treated and untreated pears after 12 days.
Figure 3:
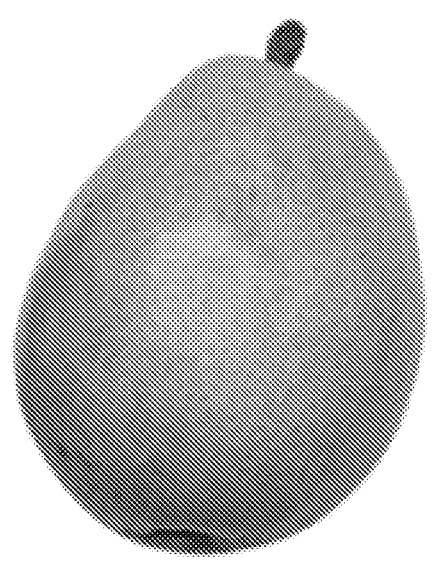
Figure 4:
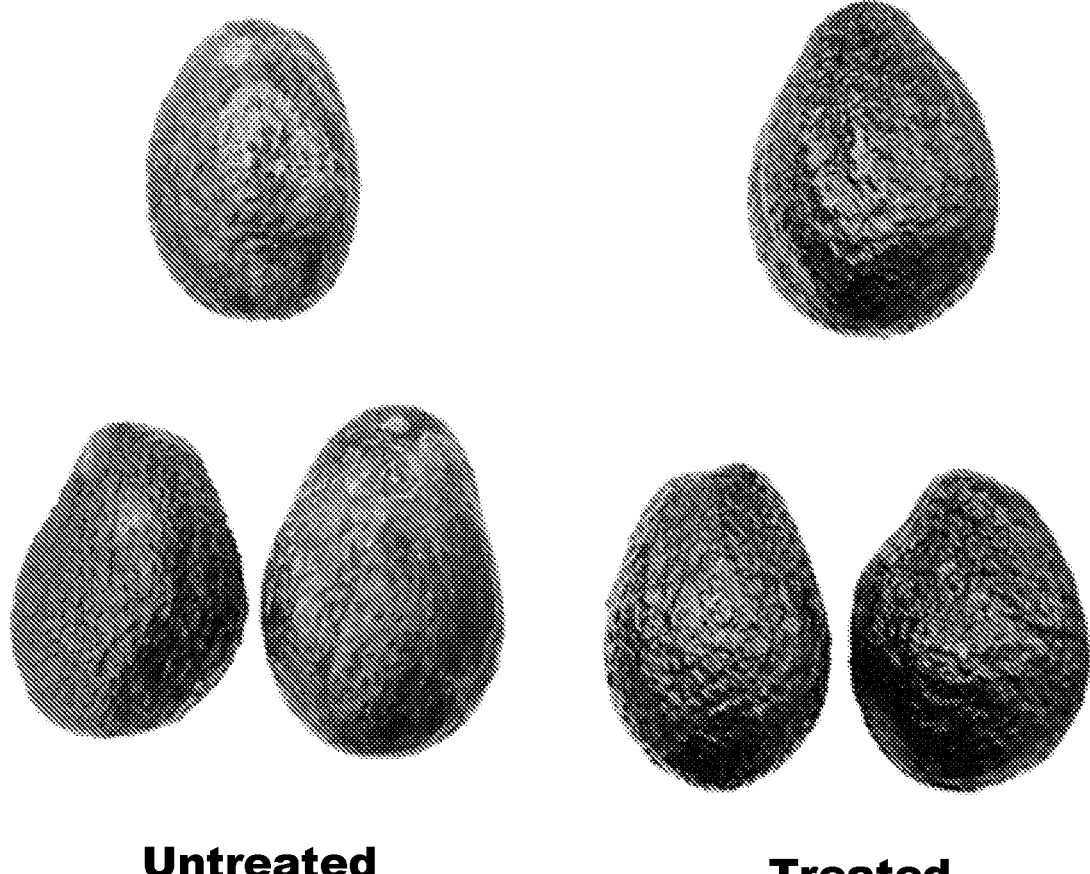
FIG. 4 shows photographs of treated and untreated avocados after 28 days.

The methods described herein provide edible, water-based zein coatings for food products to extending their shelf life. The zein film forms a barrier that prevents moisture loss, regulates oxygen exchange, inhibits ethylene production and imparts gloss on the product, improving its appearance. The ability of the water-soluble zein coating, produced and applied as described herein, to extend the shelf life of oranges, bananas, pears, and avocados is shown in the graph of FIG. 1 and the images included in FIGS. 2, 3 and 4 of the drawings, respectively.

Further, this coating solution can act as a drop-in additive to other edible or non-edible film-forming starches, carbohydrates, and other natural or synthetic polymers. Natural polymers applicable to the present invention include, but are not limited to, the following: pullulan, starch, gelatin, pectin, sodium alginate, and the like; synthetic polymers applicable to the present invention include, but are not limited to, the following: hydroxy propyl methyl cellulose, sodium carboxy methyl cellulose, poly ethylene oxide, hydroxy propyl cellulose, poly vinyl pyrrolidone, poly vinyl alcohol, and the like.

Additional Exemplary Non-Food Implementations

The coating solution described herein can be used in a range of additional areas, unrelated to food. These include, but are not limited to, the following areas:

Packaging materials of woven and non-woven cellulosic and other fiber materials. Relevant products include, for example, loose-laid and molded formats, i.e., clamshell, food liners, etc., and the like.

Sheet paper goods. Such products include products of spinneret, electrospinning, blow-spinning, and extrusion production, as well as foams, castings, and molded products.

Personal care, dermal, medical, and cosmetic products. Water-soluble zein systems can be incorporated in a range of personal care products, including moisturizing products (as an anchoring humectant), hair care products (providing cuticle binding and smoothing properties), wound care (allowing for site protection and drug elution), and many others.

Metal protective coatings. Water-dispersion properties can be useful after the product has dried upon hard surfaces, thus creating novel and worker-safe metal protective coatings for both home and industry.

Coatings. Water-soluble zein in varying concentrations can be applied as a coating to further provide surface protection as a graffiti protectant, in sandblasting and etching operations, in ablative masking, etc.

Those skilled in the art will appreciate that the above-described manufacturing procedures and coating application procedures are merely exemplary. Those skilled in the art will further understand that modifications of the above-described processes can achieve comparable results. Those skilled in the art will further be able to determine varying concentrations of the components used in formation of the aqueous zein solution.

The embodiments discussed herein are merely illustrative of the present invention. Various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions should not be considered in a limiting sense, as it is understood that the present invention is in no way limited to only the embodiments illustrated. However, it will be appreciated that modifications and variations are covered by the above teachings and within the scope of the appended claims without departing from the spirit and intended scope thereof.

What is claimed is:

1. A method of producing an aqueous solution of zein suitable for forming edible coatings, said method comprising the steps of:

a) providing an alcohol-free, non-corrosive, non-flammable amphipathic carrier solvent;

b) combining zein with the alcohol-free, non-corrosive, non-flammable amphipathic carrier solvent, and heating the combined zein and alcohol-free, non-corrosive, non-flammable amphipathic carrier solvent to dissolve the zein in the alcohol-free, non-corrosive, non-flammable amphipathic carrier solvent;

c) adding a surfactant to the combination of step b) to form a Phase I solution;

d) providing a Phase II aqueous solution comprising primarily water and not including alcohol; and e) combining the Phase I solution of step c) with the Phase II aqueous solution of step d) to provide an aqueous solution of zein wherein the alcohol-free, non-corrosive, non-flammable amphipathic carrier solvent is [1,3]-propanediol.

2. The method of claim 1 wherein the heating step includes heating the combined zein and alcohol-free, non-corrosive, non-flammable amphipathic carrier solvent to at least 105 degrees Centigrade.

3. The method of claim 1 wherein the step of providing the Phase II aqueous solution further comprises adding an edible plasticizer to such aqueous solution.

4. The method of claim 3 wherein the edible plasticizer comprises polyethylene glycol.

5. The method of claim 1 wherein the step of providing the Phase II aqueous solution further comprises adding a fatty acid to such aqueous solution.

6. The method of claim 5 wherein the fatty acid comprises lauric acid.

7. The method of claim 1 wherein the step of providing the Phase II aqueous solution further comprises adding a further ingredient selected from the group of ingredients consisting of flavorings, nutrients, mold inhibitors, sprout inhibitors, gloss agents, essential oils, extracts, cannabidiol, fungicides and antibacterials.

8. The method of claim 1 wherein the step of providing the Phase II aqueous solution further comprises adding a further ingredient selected from the group of ingredients consisting of waxes, lipids, polysaccharides, cellulose and cellulose derivatives.

9. The method of claim 1 wherein the surfactant is selected from the group of non-ionic surfactants consisting of polysorbate 80, sorbitan, and surfactin.

10. The method of claim 1 wherein the surfactant is surfactin.

11. The method of claim 1 wherein the surfactant is selected from the group of anionic surfactants consisting of rhamnolipids, sophorolipids, phospholipids, mono-glycerides and di-glycerides.

12. The method of claim 1 wherein the step of combining zein with the alcohol-free, noncorrosive, non-flammable amphipathic carrier solvent includes combining one part zein with approximately four parts alcohol-free, non-corrosive, non-flammable amphipathic carrier solvent by weight.

13. The method of claim 1 wherein the step of combining the Phase I solution of step c) with the Phase II aqueous solution of step d) includes the further steps of:

a) heating the Phase I solution to approximately 65 degrees Centigrade;

b) heating the Phase 2 solution to approximately 70 degrees Centigrade; and c) slowly delivering the Phase I Solution into the Phase 2 solution under continuous stirring.

14. The method of claim 1 wherein the step of combining the Phase I solution of step c) with the Phase II aqueous solution of step d) includes the step of mixing approximately one part of Phase I solution with 8 parts of Phase II solution by weight.

15. A method of forming an edible coating on an edible article comprising the steps of:

a) producing an alcohol-free, non-corrosive, aqueous solution of zein in accordance with the method of claim 1;

b) applying a film of such aqueous solution on the edible article; and c) drying such film of aqueous solution of zein to form an edible coating on the edible article.

* * * * *